Patented Apr. 16, 1935

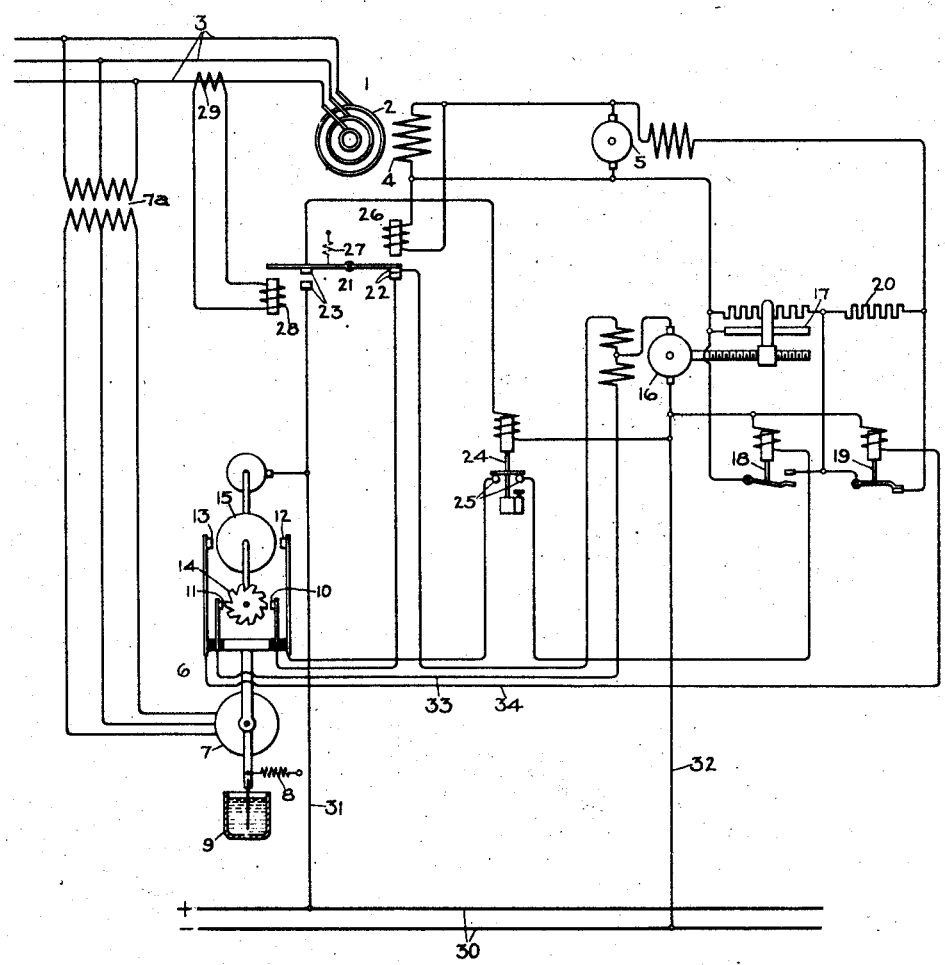

1,998,295

UNITED STATES PATENT OFFICE 1,998,295

ELECTRICAL PROTECTIVE SYSTEM

Louis W. Thompson, Schenectady, N. Y., assignor to General Electric Company, a corporation of New York Application July 21, 1932, Serial No. 623,756
Renewed August 16, 1934

6 Claims. (Cl. 171—312)

My invention relates broadly to electrical protective systems, and more particularly to an automatic system for limiting the temperature rise of dynamo-electric machines.

The present invention is a modification of the invention which is disclosed and claimed in an application of E. M. Hunter, Serial No. 623,749, filed July 21, 1932, and assigned to the assignee of the present application. In the Hunter application the temperature rise of the dynamo-electric machine is limited to a maximum value by means of a voltage relay which is connected to be responsive to the voltage of the field winding of the dynamo-electric machine and which controls the means for varying the excitation of this field winding. The theory is that the temperature rise of a dynamo-electric machine is ordinarily substantially proportional to the watts dissipated in its field winding and the steady state voltage across the field winding ordinarily bears a substantially direct relation to the watts dissipated.

In accordance with my invention I modify the action of the voltage responsive device in such a manner that the voltage at which the device is actuated varies substantially inversely with the load on the machine. The reason for doing this is that the degree of excitation of a dynamo-electric machine is not always substantially proportional to its total losses, and consequently, to its overall temperature rise. For example, a synchronous condenser may sometimes have to be operated under-excited so as to supply large lagging currents which may cause severe overloading and heating, although the watts dissipated in the field winding are relatively small.

An object of my invention is to provide a new and improved electrical protective system.

My invention will be better understood from the following description taken in connection with the accompanying drawing, and its scope will be pointed out in the appended claims.

Referring now to the single figure of the accompanying drawing, in which I have illustrated diagrammatically one embodiment of my invention, 1 is a dynamo-electric machine which, it will be assumed, is a synchronous condenser, and which has an armature 2 connected to a circuit 3, and field winding 4 connected to be energized by an exciter 5. I may control the voltage of exciter 5 and consequently the excitation of machine 1 in any manner and, as illustrative of one such controlling arrangement, I have shown an automatic voltage regulator 6 of the type which is disclosed and claimed in my Patent No. 1,848,852, granted March 8, 1932, and assigned to the assignee of the present application. Regulator 6 comprises a voltage responsive control member in the form of a torque motor 7 which is connected to respond to the voltage of circuit 3 through suitable potential transformer 7a. Motor 7 is connected to produce a clockwise torque which is arranged to be exactly balanced, at a normal voltage on circuit 3, by a spring 8. An oil-pot 9 serves to dampen the motion of motor 7 and improve the action of the regulator. Arranged to be moved by motor 7 are low speed raise and lower contacts 10 and 11, respectively, and high speed raise and lower contacts 12 and 13, respectively. Contacts 10 and 11 are arranged to contact with a center contact member 14, while contacts 12 and 13 are arranged to contact with a center contact member 15. Under the control of low speed raise and lower contacts 10 and 11 is a reversible pilot motor 16 which is arranged to operate a rheostat 17 connected in the field winding circuit of exciter 5. Under the control of high speed raise and lower contacts 12 and 13 are a pair of relays, or contactors, 18 and 19, respectively. Contactor 18 has its contacts normally open and is arranged to short circuit the entire rheostat 17 when it is actuated. Contactor 19 normally has its contacts closed and is arranged to normally short circuit a resistance 20 which is connected in the field circuit of exciter 5. When contactor 19 is actuated, it opens its contacts and thereby inserts the resistance 20 in the field circuit of the exciter thereby lowering the voltage of the exciter consequently the energization of the field winding 4 of the machine 1.

Arranged to control the action of the regulator in increasing the excitation of the winding 4 is a relay 21 having a pair of normally closed contacts 22. These contacts are connected in the circuit for the motor 16 which is controlled by the low speed raise contact 10. Relay 21 is also provided with a pair of normally open contacts 23 which are in an energizing circuit for a time delay relay 24. Relay 24 has a pair of normally closed contacts 25 which are connected in the energizing circuit for the high speed raise relay 18. This circuit is controlled by the high speed raise contact 12. Relay 21 is arranged to be actuated by a voltage winding 26 connected to respond to the voltage of field winding 4. Arranged to oppose voltage coil 26 is a biasing spring 27. A coil, or winding, 28 which is energized in accordance with the load, or output, of machine 1 acts cumulatively with respect to voltage winding 26. As this machine is provided with a voltage regulator, its voltage is substantially constant. Therefore, its current will be proportional to its volt-ampere output, or load, and consequently coil 28 is connected in circuit 3, through a suitable current transformer 29, so as to respond to the current in the machine 1.

A suitable source of current, such as a direct current supply bus 30, is provided for operating the motor 16 and the relays 18, 19 and 24. Center contacts 14 and 15 are connected to the positive side of the supply circuit 30 through a conductor 31.

Regulator 6 operates as follows: If the voltage of circuit 3 is slightly below normal the torque of motor 7 will be overcome by the counter torque of spring 8 and low speed raise contact 10 will come into engagement with center contact 14. When this happens a circuit is completed for motor 16 as follows: Conductor 31, contacts 14 and 10, contacts 22 of relay 21, the motor 16 through its upper field winding, and back to the negative side of the supply circuit through a conductor 32. This energization of motor 16 is such as to cause it to operate in the proper direction to decrease the resistance value of rheostat 17 and thereby increase the excitation of the exciter 5 and consequently increase the excitation and voltage of the main machine. This operation of rheostat 17 is such as to increase the energization of field winding 4 in relatively small increments. If the voltage of circuit 3 is considerably below normal contact 10 will be flexed and contact 12 will engage contact 15, thereby completing an energizing circuit for high speed raise contactor 18 as follows: Conductor 31, contacts 15 and 12, contacts 25 of relay 24, the operating coil of relay 18 and conductor 32. The operation of relay 18 removes the entire rheostat 17 from the field circuit of exciter 5 and thereby increases the excitation of winding 4 in a relatively large increment. On relatively slight and large increases in voltage above normal the torque of motor 7 overcomes the counter torque of spring 8 and contacts 11 and 13 will successively engage their respective center contacts 14 and 15. This will complete an energizing circuit for motor 16 and an energizing circuit for contactor 19, through conductors 33 and 34 respectively, thereby to reduce the energization of field winding 4 in relatively small and relatively large increments, respectively.

If the operating conditions on circuit 3 necessitate a large energization of field winding 4 its voltage may reach such a high value as to correspond to a watt input which corresponds to a limiting value of temperature rise for the machine. When this takes place the voltage relay 21 is actuated thereby opening its contacts 22 and closing its contacts 23. The opening of contacts 22 prevents the voltage regulator from producing relatively slow increases in excitation. The closing of contacts 23 causes the actuation of time delay relay 24 which, in a predetermined time, opens its contacts 25 and thereby breaks the circuit for the quick raise relay 18, thereby preventing the voltage regulator from producing relatively rapid increases in excitation. The effect of the current winding 28 is to lower the voltage at which relay 21 is actuated substantially inversely with the value of the load, or current, of machine 1. As the current in the armature of machine 1 also produces a heating effect and as the heating effect thus produced is not necessarily directly related to the heating effect of the field winding, it will be desirable to limit the maximum excitation or voltage of the main field winding, inversely with the load on the main machine. Thus, as the load increases the pull of magnet 28 increases so that the combined pull of coils 26 and 28 will overcome the pull of biasing spring 27 at lower values of field voltage when the armature current of machine 1 is at higher values.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, a dynamo-electric machine having a field winding, and means for limiting the voltage of said field winding to a maximum value which varies inversely with the load on said machine.

2. In combination, a dynamo-electric machine having a field winding, means for varying the excitation of said field winding, means responsive to the voltage across said field winding for causing said excitation varying means to limit the voltage across said field winding to a maximum value, and means responsive to the current in said dynamo-electric machine for varying said maximum value inversely with the value of said current.

3. In combination, a dynamo-electric machine having a field winding, an automatic regulator of an operating condition of said machine for varying the excitation of said field winding, means responsive to the voltage across said field winding for causing said regulator to limit said excitation to a value corresponding to a maximum field voltage, and means responsive to the current in said machine for causing said voltage responsive means to vary said maximum voltage inversely with the current in said machine.

4. In combination, a dynamo-electric machine having a field winding, an automatic regulator of an operating condition of said machine for varying the excitation of said field winding, time delay means for preventing said regulator from increasing said excitation, means responsive to a maximum field winding voltage for actuating said time delay means, and means responsive to the current in said machine for varying said maximum voltage inversely with the value of the current in said machine.

5. In combination, a dynamo-electric machine having a field winding, an automatic voltage regulator for varying the energization of said field winding in relatively small and large increments depending respectively upon whether the voltage of said machine is a relatively small or large amount below a normal value, relay means responsive to the voltage of said field winding for preventing said regulator from increasing the energization of said field winding when its voltage exceeds a maximum value, time delay means for preventing limitation of the action of said regulator in producing said relatively large increases in energization for a predetermined time after said maximum field voltage is attained, and means responsive to increases in current in said machine for causing said relay means to operate at lower values of maximum field voltage.

6. In combination, a dynamo-electric machine having a field winding, an automatic regulator of an operating condition of said machine for varying the energization of said field winding, and a relay for preventing said regulator from increasing the energization of said field winding, said relay having a pair of cumulatively acting operating windings connected respectively to be responsive to the voltage across said field winding and to the current in said dynamo-electric machine whereby said regulator will be prevented from increasing the energization of said field winding when the voltage across said field winding reaches a maximum value which varies inversely with the current in said dynamo-electric machine.

LOUIS W. THOMPSON.